United States Patent [19]

Tanaka

[11] Patent Number: 4,764,032
[45] Date of Patent: Aug. 16, 1988

[54] BALL SPLINE BEARING PROVIDED WITH A DRIVING UNIT

[75] Inventor: Kazuhiko Tanaka, Fuchu, Japan

[73] Assignee: Nippon Thompson Co., Ltd., Tokyo, Japan

[21] Appl. No.: 76,279

[22] Filed: Jul. 22, 1987

[30] Foreign Application Priority Data

Dec. 3, 1986 [JP] Japan ................... 61-286689

[51] Int. Cl.$^4$ ............................................ F16C 29/06
[52] U.S. Cl. ................................ 384/44; 384/45; 464/168
[58] Field of Search ................... 384/7, 43–45; 464/168

[56] References Cited

U.S. PATENT DOCUMENTS

| 2,945,366 | 7/1960 | Sears | 384/43 X |
| 4,582,370 | 4/1986 | Ogawa | 384/45 |
| 4,629,337 | 12/1986 | Teramachi | 384/43 |

FOREIGN PATENT DOCUMENTS

| 2557349 | 6/1977 | Fed. Rep. of Germany | 384/45 |
| 2834614 | 3/1979 | Fed. Rep. of Germany | 384/45 |
| 1026874 | 5/1953 | France | 384/45 |

*Primary Examiner*—John Petrakes
*Assistant Examiner*—Thomas R. Hannon
*Attorney, Agent, or Firm*—Rogers & Killeen

[57] ABSTRACT

A ball spline bearing provided with a driving unit wherein for a number of balls, endless circulation passages including track grooves in sets of two are formed in an external cylinder member, in which there is removably inserted a spline shaft having L-type notched grooves to form protrusions extending in the axial direction; on the both sides of the protrusion are formed track grooves respectively in opposition to the track grooves in the external cylinder member; each section remaining after the notched grooves and the protrusions have been removed from the spline-shaft circumference has a long enough circumferential length to form comparatively large rack teeth to bear a large load.

By providing a pinion to engage with the rack, an accurate positioning in the rectilinear direction can be attained based on the engagement, further a small type of driving unit may be adopted to the bearing, to the reduction of manufacturing cost of the bearing.

6 Claims, 6 Drawing Sheets

BALL SPLINE BEARING PROVIDED WITH A DRIVING UNIT

DETAILED EXPLANATION OF THE INVENTION

1. Field of Industrial utilization

The present invention relates to a ball spline bearing, more specifically it relates to a ball spline bearing which is provided with a driving unit to place a spline shaft and an external cylinder member of the bearing in a relative rectilinear motion.

2. Description of the Prior Art

A conventional spline bearing is normally provided with a driving unit such as an air cylinder, and the air cylinder places the spline shaft and the external cylinder member of the bearing in a relative rectilinear motion.

But in such a device, the axial length of the spline shaft becomes longer by the dimensions of the driving unit attached to the end of the spline shaft, and accordingly, the dimensions of the whole device will become great. Moreover, the driving unit and the mounting work thereof are so complicated that the manufacturing cost tends inevitably to be increased.

SUMMARY OF THE INVENTION

The present invention is a ball spline bearing in which a spline shaft has rack teeth formed directly thereon, and a pinion is engaged with the rack teeth and rotated, thereby to place the spline shaft and the external cylinder in a relative rectilinear motion.

PROBLEMS TO BE DISSOLVED

A transverse sectional shape of a conventional ball spline shaft is generally of a triangle or what is called a "rice ball" type, as shown, for example, in Japanese Laid-Open Patent Application Disclosure No. 39937-1972 (see FIG. 7). As regards the circumferential section 3 between the protrusions 2 on the spline shaft 1, the protrusion amount in the radially outward direction is comparatively small. Accordingly, it is impossible to form on the circumferential section 3 rack teeth extending in the axial direction (the direction perpendicular to the paper in FIG. 7), and even if such rack teeth can be formed, it will still entail disadvantage of decreasing the strength of the spline shaft 1.

As another prior art, for example, in Japanese Laid-Open Application Disclosure No. 155617-1984 (see FIG. 8), there is disclosed a type where a ball spline shaft 4 is shaped into a special form. In this case, it is possible to form rack teeth in the circumferential portion 6 between projections 5 of the spline shaft 4. However, the rack teeth formed in the circumferential portion 6 are so small that they cannot bear a large load. Moreover, the shape of the spline shaft 4 itself is complicated, and it involves disadvantage of increasing the manufacturing cost.

OBJECTS OF THE INVENTION

The present invention has been made in view of the aforesaid problems to be solved in the conventional art; it aims to provide a ball spline bearing equipped with a driving unit, at a reasonable price, simply by forming rack teeth in one of the circumferential portions, without performing any complicated working for the sectional shape of the ball spline shaft, and without requiring any special driving mechanism attached to the spline shaft.

CONSTRUCTION OF THE INVENTION

To attain the aforesaid objects, the ball spline bearing equipped with a driving unit, according to the present invention, includes an external cylinder member wherein track grooves are formed in sets of two lanes, in several places on the inside peripheral surface, and endless circulation passages including said track grooves are formed inside, a number of balls inserted in the endless circulation passages formed in the inside of said external cylinder member, and a spline shaft of a nearly circular section which is removably inserted and accommodated in said external cylinder member, nearly L-type notched grooves being formed in a plurality of places of said spline shaft in such a manner that axially extending protrusions may be formed, in several places in the circumferential direction, on the spline shaft, track grooves being formed on the side face of the protrusive side of said notched groove, in opposition to respective track grooves formed in said external cylinder member, each of the remaining circumferential sections on the spline shaft, except said notched grooves and said protrusions, being comparatively long in the circumferential direction; and rack teeth being formed in one of said remaining circumferential sections.

Said protrusions on the spline shaft are formed preferably in three places in the circumferential direction.

FUNCTION OF THE INVENTION

In the present invention, a rack can be provided through comparatively simple working steps of forming rack teeth in a part of the circumferential sections in the spline shaft, except notched grooves and protrusions, hence the manufacturing cost of the present spline bearing can be held down.

And each of the remaining circumferential sections has comparatively a long length in the circumferential direction, hence the formed teeth are also of large enough dimensions, to bear satisfactorily a large load to be applied.

Further, by providing means (for example, a pinion) to engage with the rack in the external cylinder member of the bearing, a precise positioning in the rectilinear direction (the axial direction of the spline shaft) can be accomplished based on engagement between the rack and the pinion, and a ball spline bearing having a small-sized driving unit can be provided at a reasonable price.

1, 4, 10 . . . spline shafts; 2, 5, 16 . . . protrusions; 12 . . . an external cylinder member; 14 . . . rack teeth; 18 . . . a projection of the external cylinder member; 20, 30 . . . track grooves; 28 . . . a notched groove; 32 . . . a remaining circumferential section; 34 . . . a pinion; 38 . . . a servo-motor; B . . . balls.

EMBODIMENT

Figure 1:
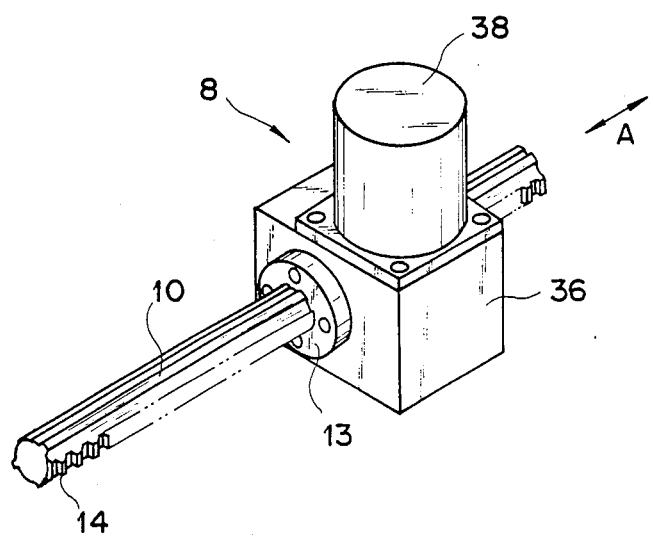
FIG. 1 is a perspective view of a spline bearing having a driving unit, according to the present invention.
Figure 2A:
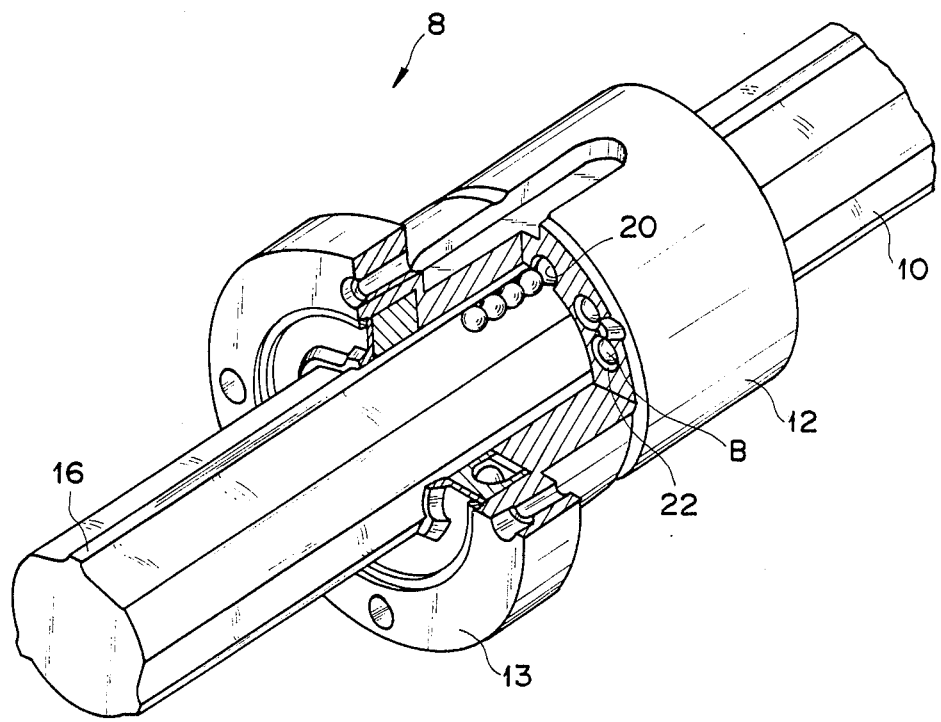
FIG. 2A is a perspective view, partly broken, of a spline bearing having a driving unit, according to the present invention.
Figure 2B:
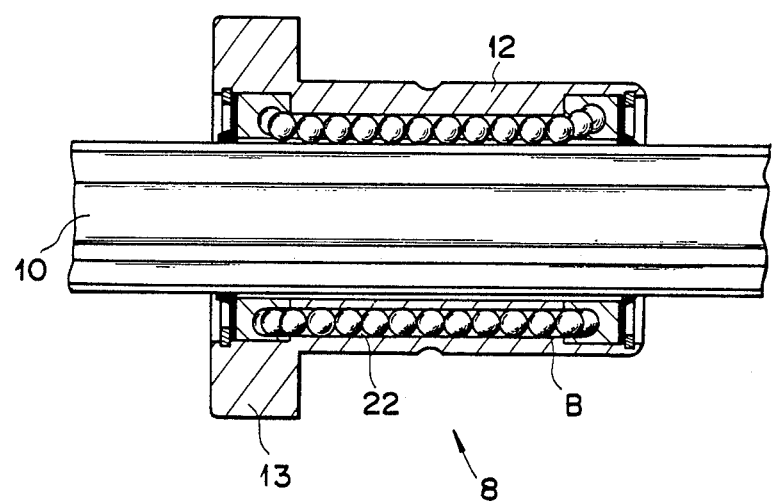
FIG. 2B is a vertical section of a spline bearing having a driving unit, according to the present invention.

Referring to FIGS. 1-6, explanation is given below of a working example of the present invention. Incidentally, identical symbols are given to dentical parts in the drawings. In FIGS. 1, 2A and 2B, the general body of the ball spline bearing having a driving unit is indicated by symbol 8. A spline shaft is represented by 10, an external cylinder member is represented by 12; rack teeth 14 (not illustrated in FIGS. 2A and 2B) are formed in the spline shaft 10. In each of 2A and 2B, the bearing in FIG. 1 is shown in the state where the housing (36) and the servo-motor (38) have been removed. Symbol 13 represents a flange.

Figure 3:
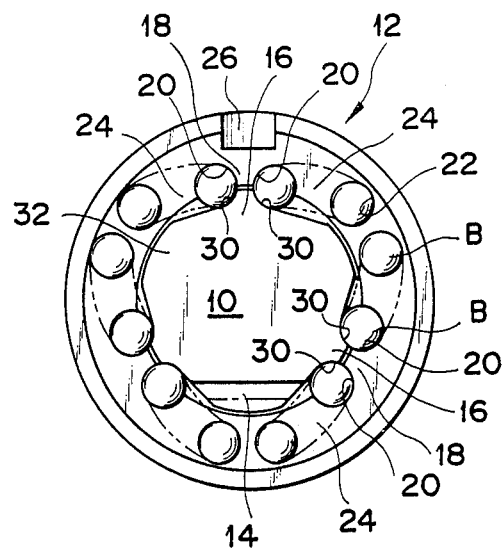
FIG. 3 is a transverse sectional view of a spline shaft and an external cylinder member used in the present invention.

FIG. 3 shows a transverse cross section of the spline shaft 10 and the external cylinder member 12. In FIG. 3, 16 represents a protrusion of the spline shaft 10, and the protrusion 16 extends in the axial direction, that is, in the direction perpendicular to the paper on which FIG. 3, is drawn. And a projection 18 is formed in opposition to the protrusion 16 on the inside peripheral surface of the external cylinder member 12. A set of track grooves 20, 20 are formed on both side faces of the projection 18, and balls B roll over in the track grooves 20, 20. Symbol 22 is a return passage, and the track groove 20 and the return passage 22 are connected by a direction change passage 24 illustrated by a two-dot long and two short dash line in FIG. 3. The track groove 20, the direction change passage 24 and the return passage 22 define a lane of endless circulation passage, and balls B circulate endlessly in the endless circulation passage. Incidentally, 26 is a key provided in the external cylinder member 12.

As obvious from FIG. 3, the endless circulation passages (20, 22 and 24) for the endless circulation of balls B are formed in sets of two lanes, on both sides of the projection 18, in the external cylinder member 12. The spline shaft 10 is removably inserted and accommodated in the bore of external cylinder member 12 of the aforesaid construction.

Figure 4:
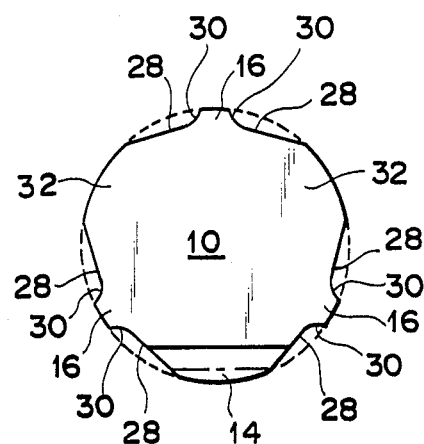
FIG. 4 is a transverse sectional view of a spline shaft used in the present invention.

Referring to FIG. 4, explanation is given below the spline shaft 10.

As can be seen from the profile illustrated by the dotted line in FIG. 4, the transverse sectional shape of the spline shaft 10 is generally circle. The portions encircled by the solid line and the dotted line are cut off from the circumference of the circle, consequently nearly L-shaped notched grooves 28 are formed. And two such notched grooves 28 define one protrusion 16. The notched groove 28 is formed such that it will extend in the vertical direction to the paper in FIG. 4. Track grooves 30 are formed on the sides of the protrusion 16, or on the base side face of the protrusion 16, in oppostion to the track groove 20 of the external cylinder member 12. That is, loaded balls are in a state of being clamped between the track groove 20 and the track groove 30.

The portions represented by symbols 32 in FIG. 4 are remaining circumferential sections when the protrusions 16 (three portions in FIG. 4) and the L-shaped notched grooves 28 (six portions in FIG. 4) have been excluded from the circumference of the spline shaft 10. The rack teeth are formed in any one of the remaining circumferential sections 32. As obvious from the drawing, since the circumferential length of the remaining circumferential section 32 is comparatively long, rack teeth 14 can comparatively easily be worked, and the formed rack teeth 14 can bear a big load.

Figure 5:
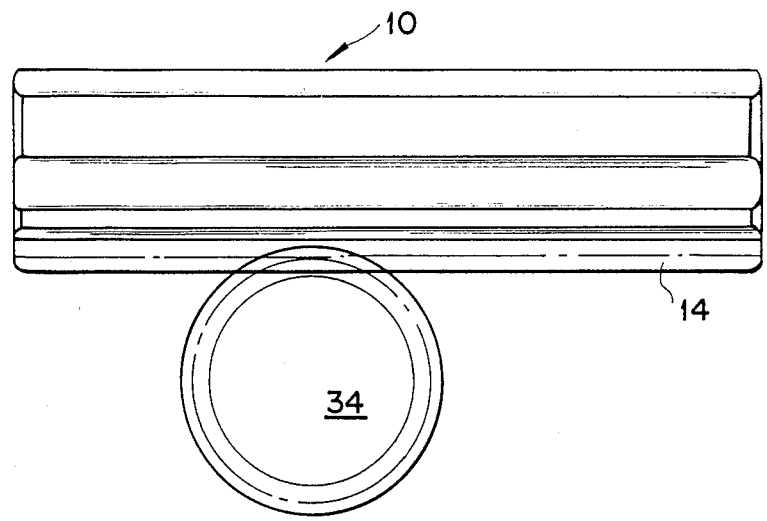
FIG. 5 and FIG. 6 illustrate respectively a spline shaft and means for engagement.
Figure 6:
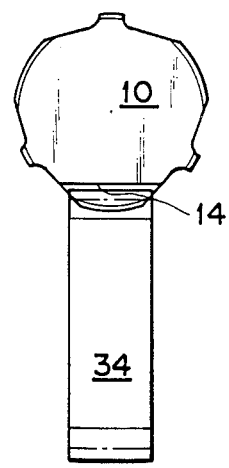
Figure 7:
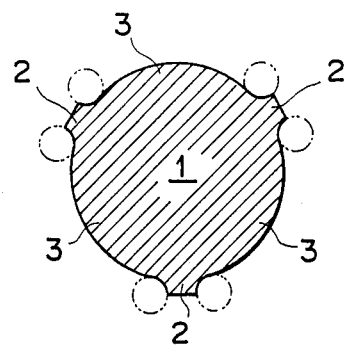
FIG. 7 and FIG. 8 illustrate respectively a spline shaft in a conventional art.
Figure 8:
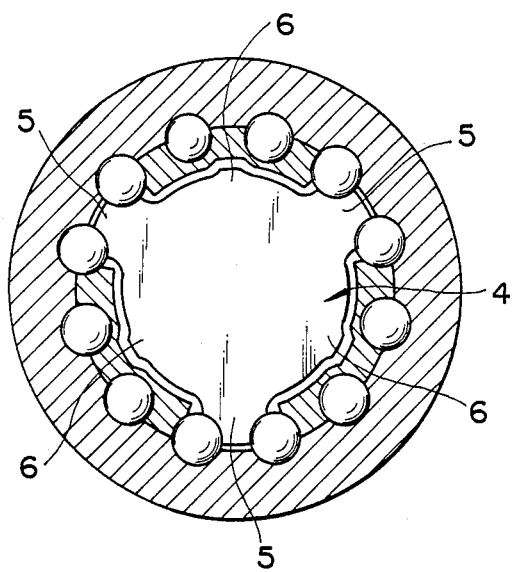

FIGS. 5 and 6 illustrate means to be engaged with the rack teeth 14, and in the present working example, a pinion 34 is employed. The pinion 34 is attached to a servo-motor mounted on the housing 36 in FIG. 1. And as is obvious from FIG. 5 and FIG. 6, the pinion 34 is in engagement with the rack 14. Accordingly, when the servo-motor 38 is driven, the spline shaft 10 is placed in a lengthwise movement in the direction A (FIG. 1). By the engagement between the rack and the pinion, an accurate positioning can be attained.

Incidentally in the illustrated working example, protrusions 16 of the spline shaft 10 are formed in three places, accordingly, six lanes of the track groove 20 or the endless circulation passage are formed in the external cylinder member 12. But it is also possible to form four lanes of the endless circulation passags, or to form eight or more lanes thereof.

In the present specification, explanation has been given of the ball spline shaft, but the present invention can also be practiced in a case where rollers are employed as the rolling element.

EFFECT OF THE INVENTION

Effects of the present invention are enumerated below.

(1) The external cylinder member and the spline shaft can easily be placed in a relative rectilinear motion by attaching a pinion gear in opposition to the rack formed in the spline shaft, and rotating the pinion gear.

(2) The driving unit mounted on the bearing can be made smaller than in any other type of bearing.

(3) The manufacturing cost is reasonable.

(4) An accurate positioning can be attained in the rectilinear motion.

What is claimed is:

1. A shaft for a ball spline bearing comprising:
   a rod having a generally cylindrical shape;
   plural L-shaped grooves in the external surface of said rod extending axially and each having a long side and a short side, each said short side having an arcuate shape and each said long side being a straight line, when viewed in cross section.

2. The shaft as defined in claim 1 wherein said long side, when viewed in cross section, is generally parallel to a line tangent to the surface of said rod at a point where a line connecting the center of said rod to the point of joining said long and short sides intersects the circumference of said rod.

3. A ball spline bearing provided with a driving unit comprising:
   an external cylinder member (12) wherein first track grooves (20, 20) are formed in sets of two lanes, in several places (18) on the inside peripheral surface, and endless circulation passages including said first track grooves (20, 20) are formed inside;

plural balls (B) inserted in the endless circulation passages formed in the inside of said external cylinder member (12);

a spline shaft (10) having a nearly circular cross section, which is removably inserted and accommodated in said external cylinder member 12;

nearly L-type notches grooves (28) being formed in a plurality of places of said spline shaft (10) in such a manner that axially extending protrusions (16) may be formed, in several places in the circumferential direction, on the spline shaft (10);

second track grooves (30) having an arcuate shape in cross section being formed on said notched groove (28) by both sides of the protrusion (16), in opposition to respective said first track grooves (20) formed in said external cylinder member (12), each of the remaining circumferential sections (32) on the spline shaft (10), except said notched grooves (28) and said protrusions (16), being comparatively long in the circumferential direction; and rack teeth (14) formed in one of said remaining circumferential sections (32).

4. A ball spline bearing provided with a driving unit of claim 3
wherein the protrusions (16) of said spline shaft (10) are formed
in three places in the circumferential direction.

5. A ball spline bearing provided with a driving unit comprising:

an external cylinder member (12) having an axial bore wherein first track grooves (20, 20) are formed in sets of two lanes, in several places (18) on the inner peripheral surface thereof and endless circulation passages are formed each consisting of said first track grooves (20, 20), direction change passages (24) and ball return passage (22) inside said cylinder member (12);

spline shaft (10) having a generally circular cross section, on the outer periphery of which are formed a plurality of axially extending ridges (16) at several places along its circumference, each of said ridges (16) retaining, at the crest surface, part of the circumference of the spline shaft and each of the opposing side surfaces thereof having a circular arc cross section portion to form a load carrying second track groove (30) with a continuing and adjacent relieved surface portion (28) having a straight line cross section extending generally in the direction tangential to the circumference of the related ball return passage, thereby forming a groove having a nearly L-shaped cross section, while leaving, on the circumference of the spline shaft, a plurality of remaining portions (32) each having a relatively longer arcuate cross section and axially extending on the outer peripheral surface of the spline shaft, said external cylinder member (12) being adapted to receive, within said axial bore, said spline shaft in an axially movable fashion with said first track grooves (20, 20) of the cylinder member (12) in facing relation with said load carrying second track grooves (30) provided on the spline shaft (10);

plural balls (B) inserted in the endless circulation passages of said cylinder member (12);

rack teeth (14) formed in one of said remaining portions (32) on the circumferencial surface of said spline shaft; and wherein the center line of said ball return passage (22) in the cylinder member (12) being so positioned when seen in cross section as to be nearly coincident with an extended line connecting the centers of two adjacent load carrying balls present in two adjacent load carrying second track grooves (30) that are formed on the inner peripheral surface of said cylinder member (12).

6. A ball spline bearing provided with a driving unit as defined in claim 5 wherein the axially extending ridges (16) are formed at three places along the circumference of said spline shaft (10).

* * * * *